US009288754B2

(12) United States Patent
Abraham et al.

(10) Patent No.: US 9,288,754 B2
(45) Date of Patent: Mar. 15, 2016

(54) APPARATUS AND METHODS OF POWER SAVE FOR WIRELESS ACCESS POINTS AND MULTI-HOP RELAYS

(71) Applicant: QUALCOMM Incorporated, San Diego, CA (US)

(72) Inventors: Santosh Paul Abraham, San Diego, CA (US); George Cherian, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/010,440

(22) Filed: Aug. 26, 2013

(65) Prior Publication Data
US 2014/0071870 A1    Mar. 13, 2014

Related U.S. Application Data

(60) Provisional application No. 61/698,392, filed on Sep. 7, 2012, provisional application No. 61/698,397, filed on Sep. 7, 2012, provisional application No. 61/698,955, filed on Sep. 10, 2012.

(51) Int. Cl.
G08C 17/00    (2006.01)
H04W 52/02   (2009.01)

(52) U.S. Cl.
CPC ...... H04W 52/0206 (2013.01); H04W 52/0229 (2013.01); H04W 52/0258 (2013.01); Y02B 60/50 (2013.01)

(58) Field of Classification Search
CPC ...................................................... H04W 52/02
USPC ........................................................ 370/311
See application file for complete search history.

(56) References Cited

U.S. PATENT DOCUMENTS 8,355,380 B1 * 1/2013 Banerjea ....................... 370/331
2005/0025081 A1   2/2005 Wakamatsu
(Continued)

FOREIGN PATENT DOCUMENTS

EP          1744472 A1    1/2007
WO     WO-2010030952 A2   3/2010
(Continued)

OTHER PUBLICATIONS

Camps-Mur, et al; Designing energy efficient access points with Wi-Fi Direct; Computer Networks 55(13); Jun. 22, 2011; pp. 2838-2855.
Wi-Fi Alliance Technical Committee, P2P Task Group; (Dec. 2009; Wi-Fi peer-to-peer (P2P) technical specification v1.0. ; See sections 3.3.3.2 & 3.3.3.3 on pp. 48-52.
"Wi-Fi Peer-to-Peer (P2P) Technical Specification," Wi-Fi Alliance Technical Committee P2P Task Group, version 1.1, 2010, pp. 1-159.
International Search Report and Written Opinion—PCT/US2013/056887—ISA/EPO—Mar. 14, 2014 (123942WO).
Partial International Search Report—PCT/US2013/056887—ISA/EPO—Dec. 13, 2013 (123942WO).

Primary Examiner — Christopher R Crompton
(74) Attorney, Agent, or Firm — Knobbe Martens Olson & Bear, LLP

(57) ABSTRACT

Apparatuses and methods of power save for wireless access point and multi-hop relays are disclosed. In one innovation, an apparatus comprises a memory unit configured to store latency information received from the at least one communication device and a processor operationally coupled to the memory unit and configured to retrieve the latency information from the memory unit and determine a sleep-cycle for the apparatus based on the latency information, the sleep-cycle indicating a time period when the apparatus will not receive signals and will not send signals.

53 Claims, 13 Drawing Sheets

(56) References Cited

U.S. PATENT DOCUMENTS

| | | |
|---|---|---|
| 2007/0058588 A1 | 3/2007 | Fashandi et al. |
| 2010/0054214 A1* | 3/2010 | Igarashi et al. ............... 370/336 |
| 2010/0173651 A1* | 7/2010 | Park et al. ..................... 455/458 |
| 2010/0246460 A1* | 9/2010 | Kholaif et al. ................ 370/311 |
| 2010/0284316 A1* | 11/2010 | Sampathkumar ............. 370/311 |
| 2011/0069650 A1 | 3/2011 | Singh et al. |
| 2011/0211564 A1* | 9/2011 | Yoneyama et al. ........... 370/338 |
| 2012/0106381 A1 | 5/2012 | Vedantham et al. |
| 2012/0195227 A1 | 8/2012 | Vedantham et al. |
| 2013/0028156 A1 | 1/2013 | Vedantham et al. |

FOREIGN PATENT DOCUMENTS

| | | |
|---|---|---|
| WO | WO-2011094503 A1 | 8/2011 |
| WO | WO-2012093088 A1 | 7/2012 |
| WO | WO 2013/008989 | 1/2013 |

* cited by examiner

APPARATUS AND METHODS OF POWER SAVE FOR WIRELESS ACCESS POINTS AND MULTI-HOP RELAYS

BACKGROUND OF THE INVENTION

1. Field of the Invention

This disclosure relates generally to apparatus and methods of wireless peer-to-peer communication and/or multi-hop relay communication. More particularly, the disclosure relates to power saving techniques and power optimization for wireless access point (AP) devices using peer-to-peer communication and multi-hop relay functionality.

2. Description of the Related Art

The wireless communication environment in a home or an office may include a number of different radio access technologies (e.g., devices) and standards. These technologies were initially designed for various applications and they may perform relatively well for these applications. In a typical home or office environment, access to content (e.g., web, video, etc.) may be provided by a broadband modem through the home owner's Internet connection. Mobile services may be provided through a cellular network. Wireless local area network (WLAN) access points (APs) may provide data connectivity between computers, cellphones, laptops, printers, and other wireless stations (STAs) using 802.11-based Wi-Fi technologies.

A peer-to-peer (P2P) network allows wireless STAs to directly communicate with each other. Wireless devices within range of each other can discover and communicate directly without involving central APs. In some configurations, two or more wireless communication STAs may form a P2P network. In a P2P network, the STAs may transfer data directly with each other without a dedicated base station or AP in the communication path. In some instances of a P2P network, one of the STAs may act as a group owner (GO) while the other wireless communication devices act as client stations.

Each client STA may form a link with the P2P group owner and transfer data directly with the P2P group owner. Oftentimes, data must be sent to the P2P group owner and then forwarded to another wireless STA. Such forwarding may cause delays that decrease the efficiency of the network while increasing the use of airtime. Benefits may be realized by certain improvements to P2P networks.

Battery powered access points or wireless stations may be used in certain network implementations, including wireless local area networks. In certain circumstances, APs may be used as relays, and they may be battery-powered. IEEE 802.11 currently does not describe mechanisms for AP power save. In the case of a P2P and multi-hop relay network, relay wireless stations may also be battery powered. Accordingly, it is desirable for access points and wireless stations to have power saving functionality.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

One aspect of the subject matter described in the disclosure provides an apparatus for communication with at least one communication devices. The apparatus comprises a memory unit configured to store latency information received from the at least one communication device and a processor operationally coupled to the memory unit and configured to retrieve the latency information from the memory unit and determine a sleep-cycle for the apparatus, or the processor, based on the latency information, the sleep-cycle indicating a time period when a transceiver coupled to the processor will not receive wireless communication signals and will not send wireless communication signals.

Another aspect of the disclosure provides a method of communicating with two or more communication devices. The method comprises storing latency information received from a first communication device of the two or more communication devices and retrieving the latency information. The method further comprises determining a sleep-cycle for a second communication device of the two or more communication devices based on the latency information, the sleep-cycle indicating a time period when the second communication device will not receive wireless communication signals and will not send wireless communication signals.

Another aspect of the disclosure provides an apparatus for communicating with at least one communication device. The apparatus comprises means for storing latency information received from the at least one communication device. The apparatus further comprises means for retrieving the latency information from the means for storing. The apparatus further comprises means for determining a sleep-cycle for the means for retrieving based on the latency information, the sleep-cycle indicating a time period when the means for retrieving will not receive wireless communication signals and will not send wireless communication signals.

Another aspect of the disclosure provides a non-transient computer readable media having instructions stored thereon that cause a wireless communication apparatus to perform a method. The method comprises storing latency information received from a first communication device of the two or more communication devices. The method further comprises retrieving the latency information, and determining a sleep-cycle for a second communication device of the two or more communication devices based on the latency information, the sleep-cycle indicating a time period when the second communication device will not receive signals and will not send signals.

Details of one or more implementations of the subject matter described in this specification are set forth in the accompanying drawings and the description below. Other features, aspects, and advantages become apparent from the description, the drawings, and the claims. Note that the relative dimensions of the following figures may not be drawn to scale.

Figure 1:
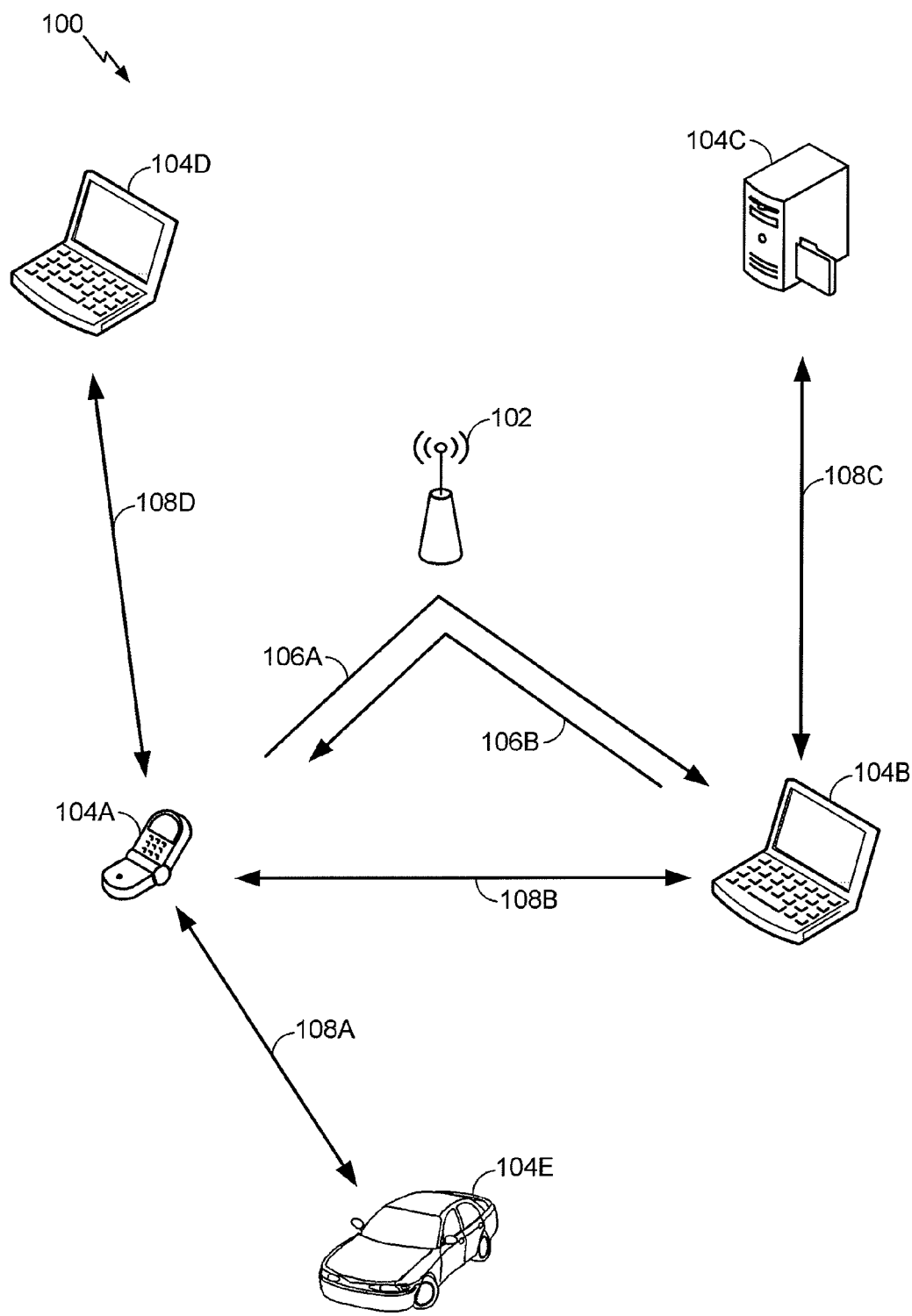
FIG. 1 is a diagram illustrating an example of a WLAN.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF THE CERTAIN IMPLEMENTATIONS

The detailed description set forth below in connection with the appended drawings is intended as a description of exemplary implementations of the disclosure and is not intended to represent the only implementations in which the disclosure may be practiced. The term "exemplary" when used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are illustrated in block diagram form or otherwise illustrated, for clarity, so as not to include every possible detail.

While for purposes of simplicity of explanation, certain methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, a person having ordinary skill in the art will understand and appreciate that a methodology could alternatively be represented as a series of interrelated states or events, such as in a state diagram. Moreover, not all illustrated acts may be required to implement a methodology in accordance with one or more aspects.

Various implementations of apparatuses and methods for saving power and for power optimization of battery-powered wireless APs in networks utilizing and multi-hop relay networks are described herein.

In some implementations, access points (APs) may be battery powered. For example, battery powered APs may be especially useful as relays. In such implementations of battery powered APs and their use as relays, to facilitate power saving, an AP doze protocol may be used. In one example, a relay may advertise periods of absence at regular intervals using signaling similar or identical to a Notice of Absence signaling attribute (for example, defined for Wi-Fi peer-to-peer). In another example, a new information element in the beacon may be used. If an NoA period overlaps with a TBTT, the relay may wakes up to transmit a beacon. A TIM element during such a wake up period does not indicate any STAs with downlink data since STAs may be in doze state. The relay may send acknowledgements to uplink data and also respond to probe and association requests.

In another power save scheme, an AP moves to a doze state opportunistically, for example, if all its client stations are in doze state. In an opportunistic power save scheme, an AP wakes up every TBTT and remains in awake state for at least a certain duration which may be referred to as the AwakeWindow time. When a relay wakes up during a TBTT that overlaps a Notice of Absence, the relay may go into a doze state immediately after sending the beacon, for example, going into a doze state without determining if all the STAs are in a doze state. In this scheme, associated STAs should not send uplink data after a beacon during such a NoA period. APs may extend their awake time beyond the AwakeWindow by sending a short communication indicating an extension, for example, an "Extend Awake" broadcast frame, and the AP will continue to remain Awake for the time indicated by the wake extension frame. That is, the AP may be configured to be awake for a certain amount of time, additional to the awake time indicated by the AwakeWindow, and this may be referred to as the AP being awake for an "extended duration." The AP sends this frame only when there is no other medium activity and only at time after the AwakeWindow time period. A STA that wakes up after the AwakeWindow determines if AP is awake by sensing packets being communicated to check for packets transmitted to or from the AP, and/or by receiving an Extend Awake Frame. An AwakeWindow may be expressed in slots. An AP may count down AwakeWindow slots when the medium is free. This ensures that the relay can enter a sleep state quickly if there are no pending uplink transmissions. The AwakeWindow count down should be restarted whenever the AP receives an uplink packet. To enable standardization in IEEE, NoA information that is in the peer-to-peer information element (IE) may be carried in a separate IE. For example, in one implementation IE fields may include: (1) Absence Duration: the length of an NoA period in μs; (2) Interval: the interval between start times of NoA periods; (3) Start time: four (4) least significant bits (LSBs) of timing synchronization function (TSF) timer at start of NoA cycle; and (4) Count: the number of NoA periods before the current setting expires.

In one implementation of an AP power save operation, the operation at the AP enables STAs to track with reasonable accuracy the awake/doze state of the AP. When the AP has packets to send, at every TBTT AP changes to Awake state and sends a beacon which contains a TIM. For every STA indicated in the TIM, the state of the AP is awake until its data is delivered. The AP will not go into doze state until downlink data for all STAs is delivered. A STA that is "polled" by the TIM may send its PS poll without explicitly determining that the AP is awake. When all downlink data is delivered, the AP starts a count-down timer operation. If uplink data is received, the AP stops the counter and remains in an awake state until each STA that it receives data from indicates that there is no more data (for example, using the More Data bit). Once the AP determines that there is no more uplink data, it starts the count down again. For STAs with uplink data, a STA can send uplink data or a QoS null within the initial "Awake" time of the AP with a more data indication on. The AP will then remain in an awake state until it receives an indication from the STA that there is no more uplink data to send. When data transmission is complete, the STA may reset the more data indication, which may indicate to the AP to start a doze state. A STA that "wakes up" in the middle of a TBTT should "assume" that the AP is in doze state if its "wake up" time is beyond the Awake time of the AP (with regard to the beacon). In some implementations, if a STA is capable of tracking the AP state by sensing data being communicated "in the air," the STA can use that information to determine if the AP is in an awake state. To help STAs that may have changed to an awake state in the middle of a beacon interval beyond the wake up interval, an AP may transmit a frame indicating that it is beginning a count-down to doze mode. In some implementations the frame contains the time remaining before the AP changes to a doze state. The frame indicates to the STA that the AP is in an awake state and can receive data for a certain time before moving into a doze state.

An "ad hoc network" refers to a self-configuring network of nodes connected by wireless links which form an arbitrary topology. An ad hoc network typically includes a number of geographically-distributed, potentially mobile units or STAs, sometimes referred to as "nodes," which are wirelessly connected to each other by one or more links (for example, radio frequency communication channels). The nodes can communicate with each other over a wireless media without support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. One characteristic of the nodes is that each node can directly communicate over a short range with nodes which are a single "hop" away. Such nodes are sometimes referred to as "neighbor nodes." A large network can be realized using intelligent access points (IAP) which provide wireless nodes with access to a wired backhaul.

In a multi-hop network, communication packets sent by a STA can be relayed through one or more intermediary STAs before reaching a destination STA. When a STA transmits packets to a destination STA and the STAs are separated by more than one hop (for example, the distance between two STAs exceeds the radio transmission range of the STAs) the packets may be relayed via intermediate STAs until the packets reach the destination STA. In such situations, each intermediate STA routes the packets (e.g., data and control packets) to a next STA along the route, until the packets reach their final destination STA. For relaying packets to a next STA, each STA may maintain routing information collected through communication with neighboring STAs. The routing information may also be periodically broadcast in the network to reflect the current network topology. Alternatively, to reduce the amount of information transmitted for maintaining accurate routing information, the network STAs may exchange routing information only when it is needed.

A Wi-Fi direct (WFD) network is a network system suggested by Wi-Fi Alliance that enables Wi-Fi STAs to be connected to each other in a P2P fashion without participating in a home network, an office network or a hot-spot network. Many Wi-Fi networks are set up in an "infrastructure mode," where an AP may be implemented as a central hub to which Wi-Fi capable STAs are connected. In an infrastructure mode of a Wi-Fi network, the connected STAs do not communicate directly, but they go through their connected AP. In a WFD network, Wi-Fi direct STAs are able to communicate with each other without requiring a shared wireless AP. In one example, the Wi-Fi direct STAs negotiate when they first connect to determine which STA acts as an AP.

As standardized in IEEE standards, such as IEEE 802.11e and IEEE 802.11z, a direct link setup (DLS) or tunneled direct link setup (TDLS) provides a capability for connecting at least two STAs. FIG. 1 illustrates an example of an implementation of an IEEE 802.11 WLAN 100 that includes STAs 104A-E and an AP 102. The AP 102 may be configured to pass traffic between at least the two STAs 104A and 104B in an infrastructure mode over connections 106A and 106B respectively. In the infrastructure mode, when the STA 104A wants to communicate with the peer STA 104B, the STA 104A may send a frame (or plurality of frames) to the AP 102. After receiving the frame from the STA 104A, the AP 102 may decode the frame, and determine that the AP 102 can successfully decode all information inside the received frame. Upon successfully decoding a frame, the AP 102 may check a destination which the frame is sent to, and thereafter forward the frame to or towards its destination accordingly. In one implementation, frames sent by the STA 104A may be forwarded to the peer STA 104B over the connection 106A via the AP 102. In some implementations, at the same time, the peer STA 104B may send a frame to the STA 104A over the connection 106B via the AP 102. DLS and TDLS are mechanisms that allows the STAs 104A and 104B to establish a direct connection 108 without additionally communicates through the AP 102. In other words, frames to be exchanged between the STAs 104A and 104B may be directly sent over the connection 108 instead of either the connection 106A or 106B. Such direct links provide a means for efficiently using wireless frequency spectrum, especially when both STAs are physically located close to each other.

IEEE 802.11z standard defines a tunneled DLS or TDLS. One TDLS feature is to provide an AP-independent DLS mechanism for minimizing the involvement by an associated AP. In one example, the STA 104A sends a direct link setup request frame to the peer STA 104B via the AP 102, as shown in FIG. 1. The peer STA 104B may reply by sending a response frame to the STA 104A via the AP 102. Different to a regular IEEE 802.11e DLS signaling frame, a TDLS signaling frame is encapsulated in a MAC data frame so that it is transferred via an AP transparently. For example, as shown in FIG. 1, the AP 102 may have no information of a TDLS signaling frame that is passing through the AP 102. This may result in a simplified two-way handshake and this two-way handshake does not require any TDLS feature to be implemented within an AP. This may simplify a deployment of TDLS features in existing communication networks.

Figure 2:
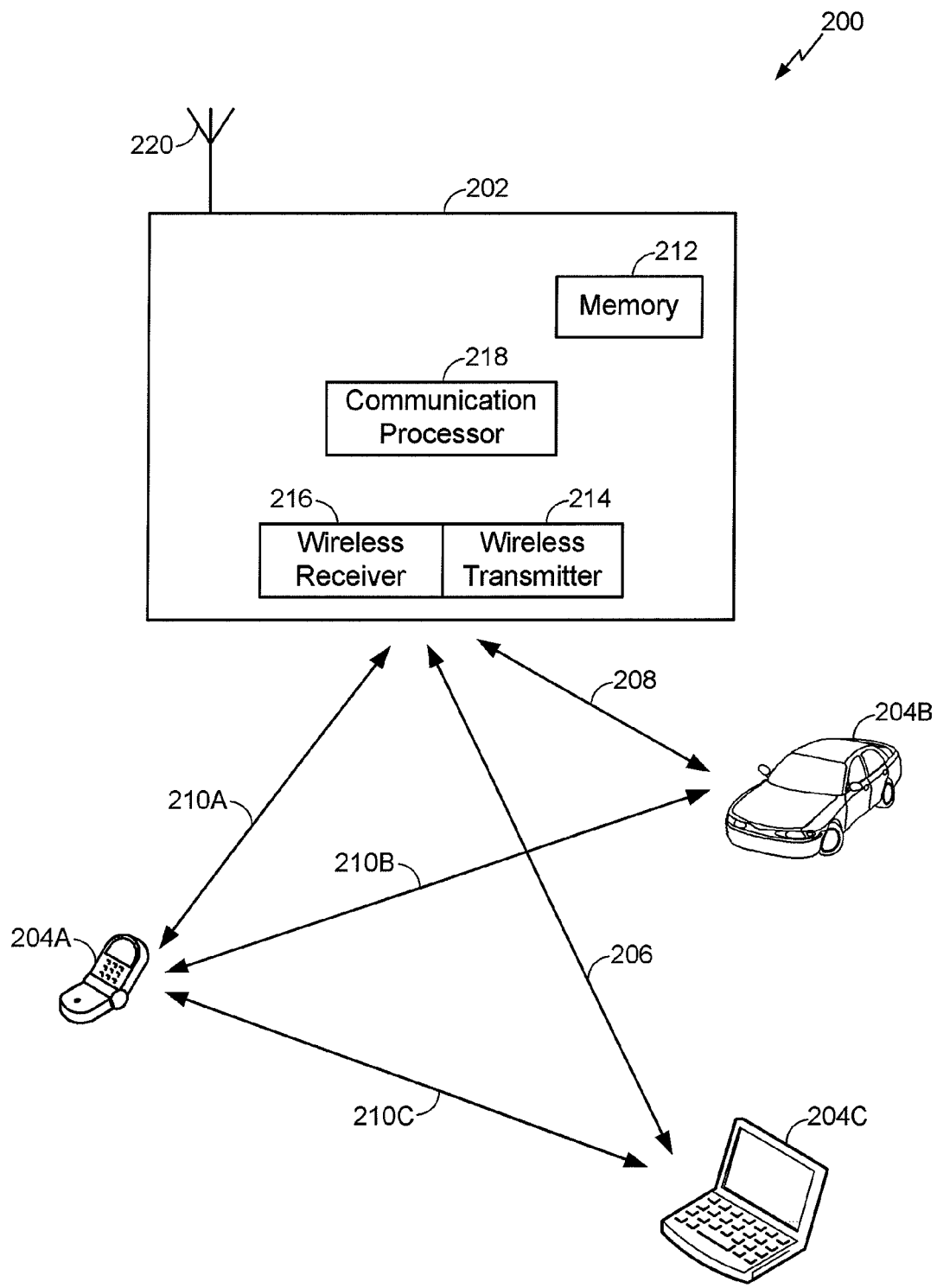
FIG. 2 is a diagram illustrating an example of a wireless AP of a WLAN.

FIG. 2 is a diagram illustrating an example of an implementation of a WLAN 200 and a wireless AP 202. Although in FIG. 2 the elements of WLAN 200 are presented and correspondingly described in one arrangement, other implementations may feature other arrangements that incorporate the same functionality. The WLAN 200 includes AP 202 and a plurality of STAs, e.g., STAs 204A, 204B and 204C. As shown in FIG. 2, the AP 202 includes at least a wireless transmitter 214, a wireless receiver 216, an antenna 220, a communication processor 218 for handling physical (PHY) layer, MAC layer and application layer communications and signaling between the AP 202 and at least one other STA. The AP 202 further includes a memory unit 212 for storing data, including communication and application related data. The communication processor 218 is at least coupled to the wireless receiver 216, the wireless transmitter 214 and the memory unit 212. Both the wireless receiver 216 and the wireless transmitter 214 are coupled to the antenna 220 for receiving and transmitting wireless electromagnetic signals, respectively, the STA 204A may be configured according to one or more implementations of the present disclosure, while the STAs 204B and 204C can be configured according to implementations of the present disclosure, or as conventional wireless clients. As shown in FIG. 2, in some implementations the STA 204A can communicate with the STAs 204B and 204C in an infrastructure mode through the AP 202 over connections 206, 208 and 210A. When a DLS or TDLS is enabled in the WLAN 200, direct communication links 210B and 210C may be set up between the STA 204A and the peer STAs 204B and 204C. As such, the STA 204A may exchange frames with the peer STAs 204B and 204C over the direct links 210B and 210C, respectively.

Figure 3:
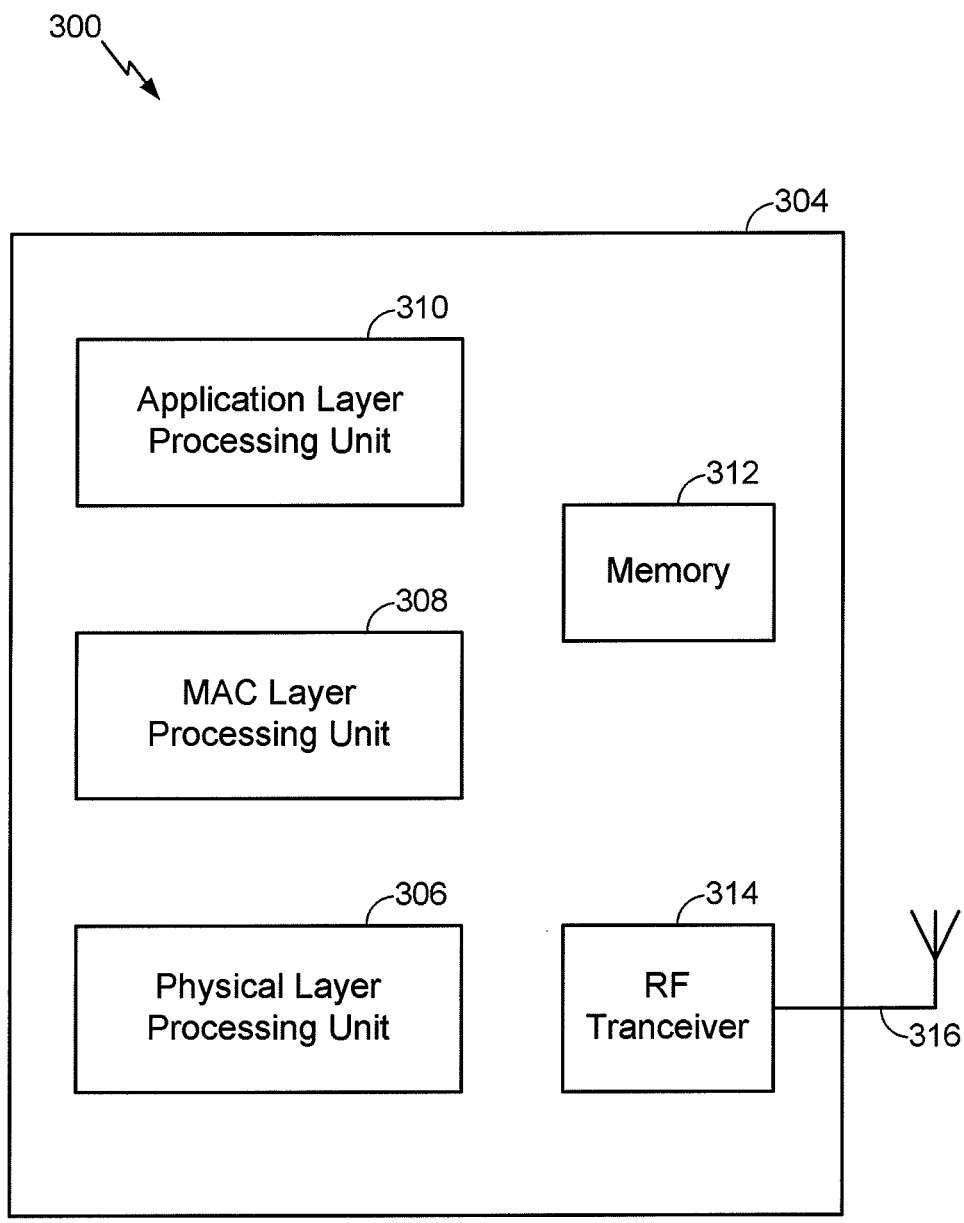
FIG. 3 is a diagram illustrating an example of a wireless STA of a WLAN.

FIG. 3 shows details of one exemplary implementation of the STA 104A illustrated in FIG. 1 and the STA 204A illustrated in FIG. 2. Although in the described implementations the elements of a STA 300 are presented in one arrangement, other implementations may feature other arrangements. In one implementation, elements of the STA 300 can be implemented in hardware, software, or any combination thereof. As shown in FIG. 3, the STA 300 includes a PHY layer processing unit 306, a memory unit 312, a radio frequency (RF) transceiver 314 and an antenna 316. It may further include a host 304, a MAC layer processing unit 308 and an application layer processing unit 310. The host 304 may be a mobile phone, Wi-Fi access point or a computer. The PHY layer processing unit 306 is coupled to the RF transceiver 314 and the memory unit 312 for receiving and transmitting wireless signals. In one implementation, the RF transceiver 314 may be similar to a combination of the wireless receiver 216 and the wireless transmitter 214 shown in FIG. 2. The MAC layer processing unit 308 is at least coupled to the PHY layer processing unit 306 and the memory unit 312. The MAC layer processing unit 308 receives application layer data packets from the application layer processing unit 310 and accordingly generates MAC layer data frames. After this, the MAC layer processing unit 308 may send the MAC layer data frames via the PHY layer processing unit 306, the RF transceiver 314 and the antenna 316. The application layer processing unit 310 is at least coupled to the MAC layer processing unit 308 and the memory unit 312. In some implementations, the application layer processing unit 310 may be further coupled to the PHY layer processing unit 306 and even the RF transceiver 314. The STA 300 may be compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 4:
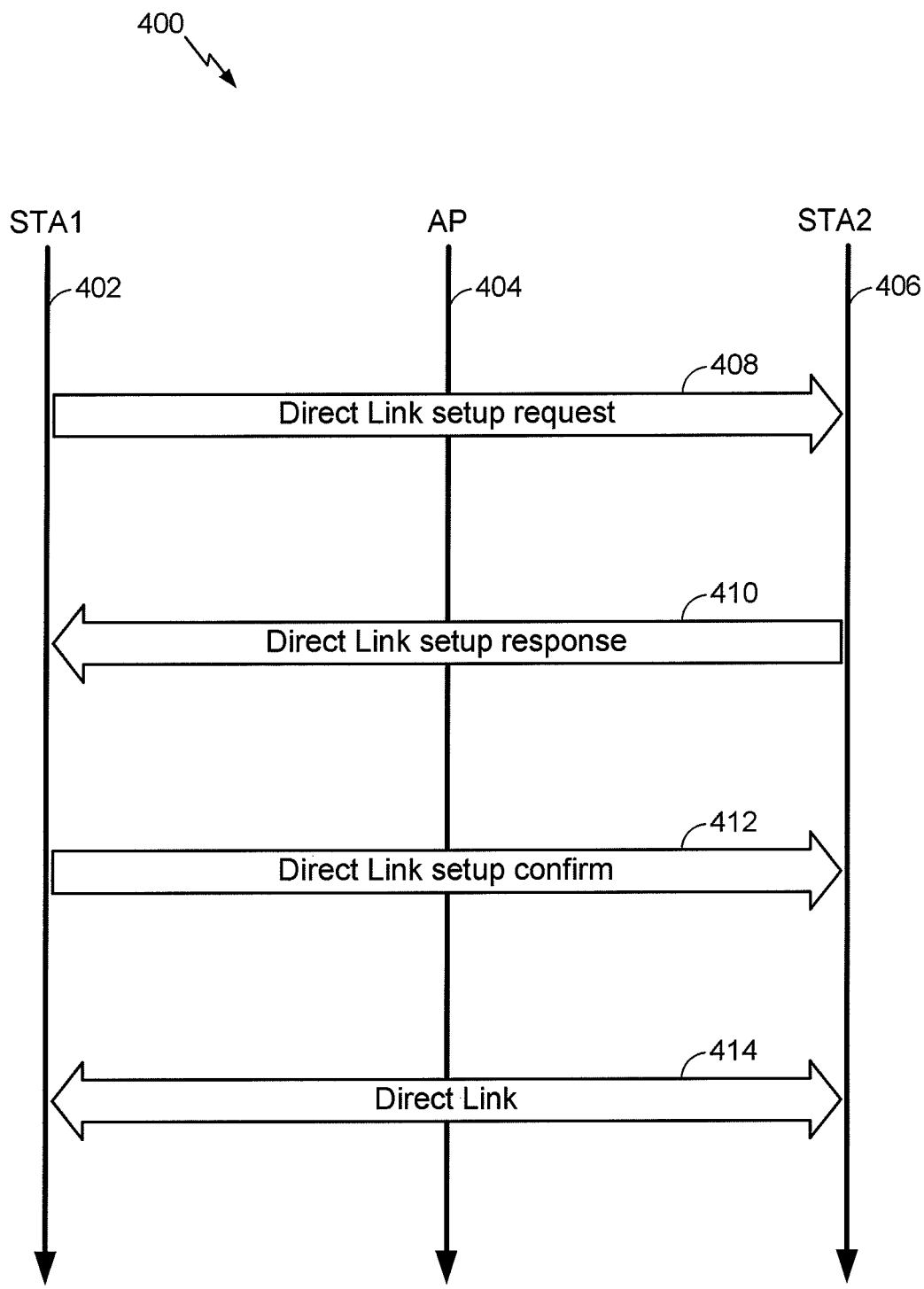
FIG. 4 is a message flow diagram illustrating an example of direct link setup procedure.

FIG. 4 shows an exemplary frame exchanges between two STAs 402 and 406 and an AP 404 in a wireless LAN according to an implementation of the present invention. Before a direct link is setup for a data exchange between two STAs, a series of frame exchanges between these two STAs for initiating and confirming the direct link. At the beginning, the initiating STA 402 issues a direct link setup request 408 directed at the target STA 406. The direct link setup request message may be encapsulated and is sent through the AP 404. This frame includes information about capabilities of the requesting STA 402. After issuing the direct link setup request 408, the initiating STA 402 may enter a listening window during which it expects to receive a direct link setup response. After successfully receiving the direct link setup request 408, the STA 406 may respond with a direct link setup response 410. This direct link setup response frame may also be tunneled through the AP 404 and include information about capabilities of the target STA 406. In addition, the direct link setup response frame may further comprise a status code indicating that either accepts or rejects the direct setup request 408. If the initiating STA 402 receives the direct link setup response 410 within a listening window and the status code of the direct link setup request 408 indicates the setup request is accepted, it replies with a direct link setup confirm 412 via the AP 404. At this point, a direct link 414 between the STAs 402 and 406 is established and the two STAs may begin to communicate directly.

P2P protocol communication is based on the use of P2P Information Element (IE), P2P Action frame and P2P Public Action frame formats. They utilize vendor specific IE and vendor specific Action frame formats as defined in IEEE Standard 802.11 with WFA organizational unique identifier (OUI) and an OUI Type indicating P2P. The formation of the vendor specific IE format as defined in IEEE Standard 802.11-2007 is shown in Table 1 below. A Length field defines following fields in an IE frame in octets. A Length field is a variable and may be set to 4 plus the total length of P2P attributes. An OUI sometimes is referred to as a vendor ID. An OUI is first 24 bits of a MAC address for a network-connected STA, and indicates a specific vendor for the STA. The P2P attributes are defined to have a common general format consisting of a 1 octet P2P Attribute ID field, a 2 octet Length field and variable-length attribute-specific information fields. More than one P2P IE may be included in a single frame. If multiple P2P IEs are present, complete P2P attribute data consists of the concatenation of P2P Attribute fields of the multiple P2P IEs. A P2P Attributes field of each P2P IE may be any length up to the maximum (251 octets).

TABLE 1

P2P IE format defined by Wi-Fi Alliance

| Field | Size (Octets) | Value (Hexadecimal) | Description |
| --- | --- | --- | --- |
| Element ID | 1 | 0xDD | IEEE 802.11 vendor specific usage |
| Length | 1 | variable | |
| OUI | 3 | 506F9A | WFA specific OUI |
| OUI Type | 1 | 0x09 (to be assigned) | Identifying the type or version of P2P IE |
| P2P Attributes | variable | | One of more P2P attributes appear in the P2P IE |

IEEE 802.11 management frames enable STAs to establish and maintain communications. An AP sends an association response frame containing an acceptance or rejection notice to a STA that is requesting an association. If the AP accepts the STA, the frame includes information regarding the association, such as an association ID and supported data rates. If the outcome of the association is positive, the STA may utilize the AP to communicate with other STAs on a network and systems on a distribution side of the AP. One or more P2P IEs shall be inserted after other information elements in an association request or re-association request frame transmitted by a P2P STA. P2P attributes for a P2P IE that is included in an association request or re-association request frame response frames sent by a P2P STA are shown in Table 2. A P2P Capability attribute shall be present in the P2P IE. An Extended Listen Timing attribute may be present in the P2P IE in the association request or re-association request frames transmitted by the P2P STA. A P2P Device Info attribute shall be present in the P2P IE.

TABLE 2

Association/Re-association Request frame format defined by Wi-Fi Alliance

| Attributes | Attribute ID | Note |
| --- | --- | --- |
| P2P Capability | 2 | The P2P Capability attribute shall be present in the P2P IE. |
| Extended Listen Timing | 8 | The Extended Listen Timing attribute may be present in the P2P IE in Association Request or Re-association Request frames transmitted by a P2P Client. |

TABLE 2-continued

Association/Re-association Request frame
format defined by Wi-Fi Alliance

| Attributes | Attribute ID | Note |
| --- | --- | --- |
| P2P Device Info | 13 | The P2P Device Info attribute shall be present in the P2P IE. |

Figure 5:
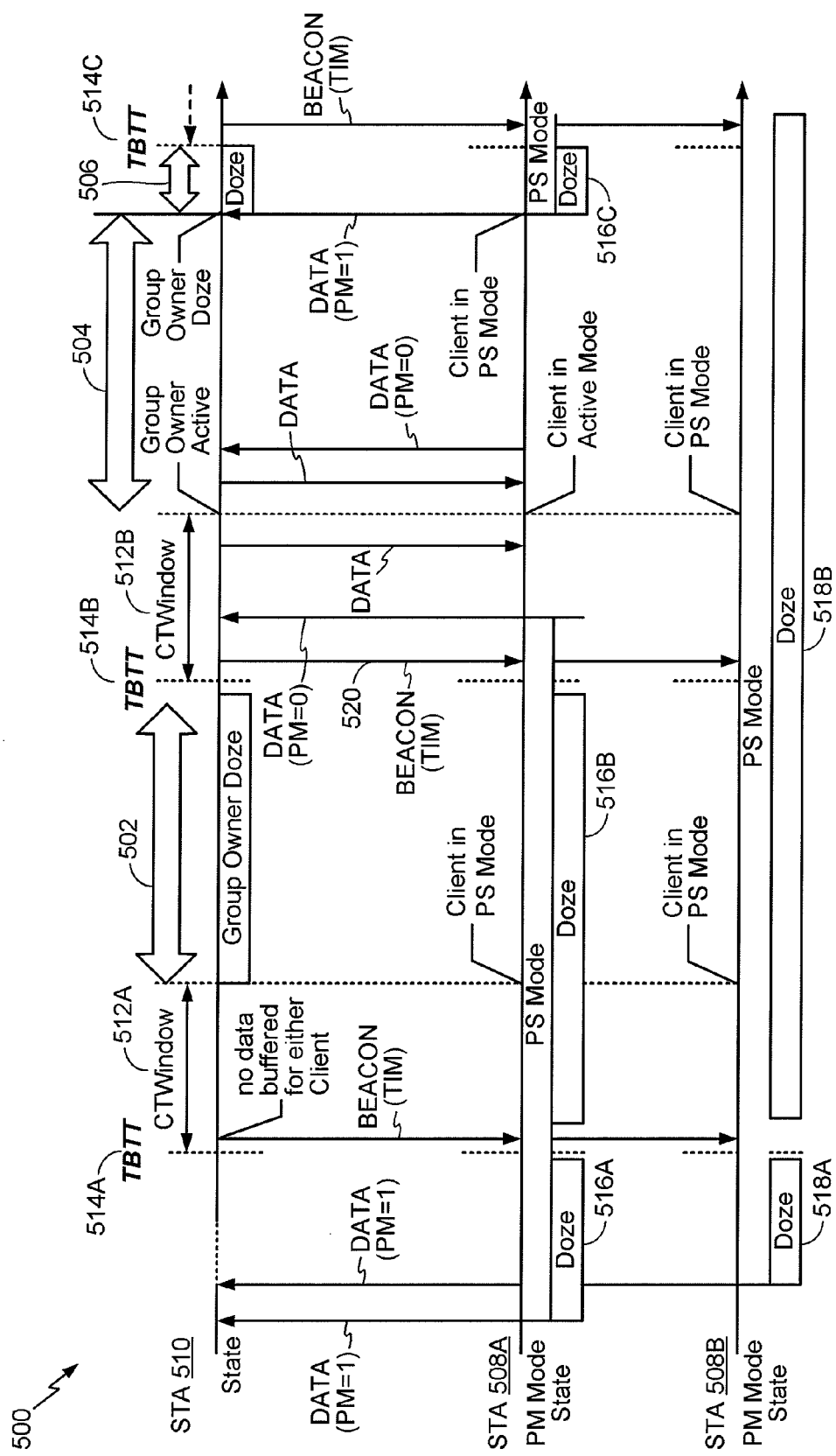
FIG. 5 is a timing flow diagram illustrating an example of opportunistic power-save.

FIG. 5 illustrates a timing flow diagram 500 of an exemplary power saving process or functionality, which may be referred to herein as "opportunistic power save." Such power saving functionality may be implemented in, for example, a WFD communication group. Opportunistic power save is a broad term that can refer to, for example, a power management scheme that allows a P2P group owner device (GO) to gain additional power savings on an opportunistic basis, for example, when the P2P GO determines that all of its clients are in a doze state. In the timing flow diagram 500 (FIG. 5), the power management states of a P2P group owner (GO) (e.g., a STA 510), a first client (e.g., a STA 508A), and a second client (e.g., a STA 508B) are shown. More specifically, the timing flow diagram 500 illustrates that the STA 510 is able to detect when both the STAs 508A and 508B are in a doze state (e.g., doze states 516A, 516B and 516C for the STA 508A and doze states 518A and 518B for the STA 508B). A detection of a doze state of the STAs may be based on notification(s) and/or detecting if there is any data buffered for either STA.

For detecting if the STAs 508A and/or 508B are in a doze state, the STA 510 may check Notice of Absence's (NoA's) sent from the STAs 508A and 508B. In each NoA sent by the STA 508A or 508B, the NoA may indicate when the STAs 508A or 508B will be in a doze state. After received these NoA's, the P2P GO 510 may detect when each of the STAs 508A and 508B will enters its own doze state.

In addition, the STA 510 may check if there is any data buffered for either STA during a listening interval, e.g., a client traffic window (CTWindow), following a beacon frame transmission by the STA 510. A CTWindow (e.g., the CTWindows 512A, 512B and 512C) is a listening period during which the STA 510 stays awake after a start of a target beacon transmit time (TBTT). The STA 510 remains on for at least one "AwakeWindow" duration, e.g., a CTWindow, after transmitting a beacon frame at a TBTT. For example, after each of TBTTs 514A, 514B and 514C, the STA 510 stays awake for at least one period of CTWindows 512A, 512B and 512C, individually.

As shown in FIG. 5, after detecting that the other STAs are in a doze state, a P2P GO may enter its own doze state until a subsequent TBTT nears. For example, after the STA 510 detects that the STA 508A is in a doze state 516B and the STA 508B is in a doze state 518B, the STA 510 may enter its own doze state 502 till the subsequent TBTT 514B nears.

In one implementation, if either the STA 508A or the STA 508B cannot be determined to be in a doze state, then the STA 510 remains awake. In another implementation, if either STA doesn't support opportunistic power save, then the STA 510 doesn't go into a doze state.

In another implementation, if either the STA 508A or 508B responds to a beacon frame by transmitting data during a listening interval (e.g., the CTWindow 512B), the STA 510 stays in an active state (e.g., an active state 504) to enable communications with the clients. As long as one of the STAs transmits data, the P2P GO stays active. For example, the timing flow diagram 500 shows that the STA 508A responds to a beacon frame 520 with data during the CTWindow 512B and thus the STA 510 stays in the active state 504 for a period of time. However, if data sent by the STA 508 have not been received for more than a threshold period of time, the timing flow diagram 500 shows the STA 510 enters another doze state (e.g., a doze state 506) for a brief amount of time until a subsequent TBTT (e.g., the TBTT 514C) nears.

Figure 6:
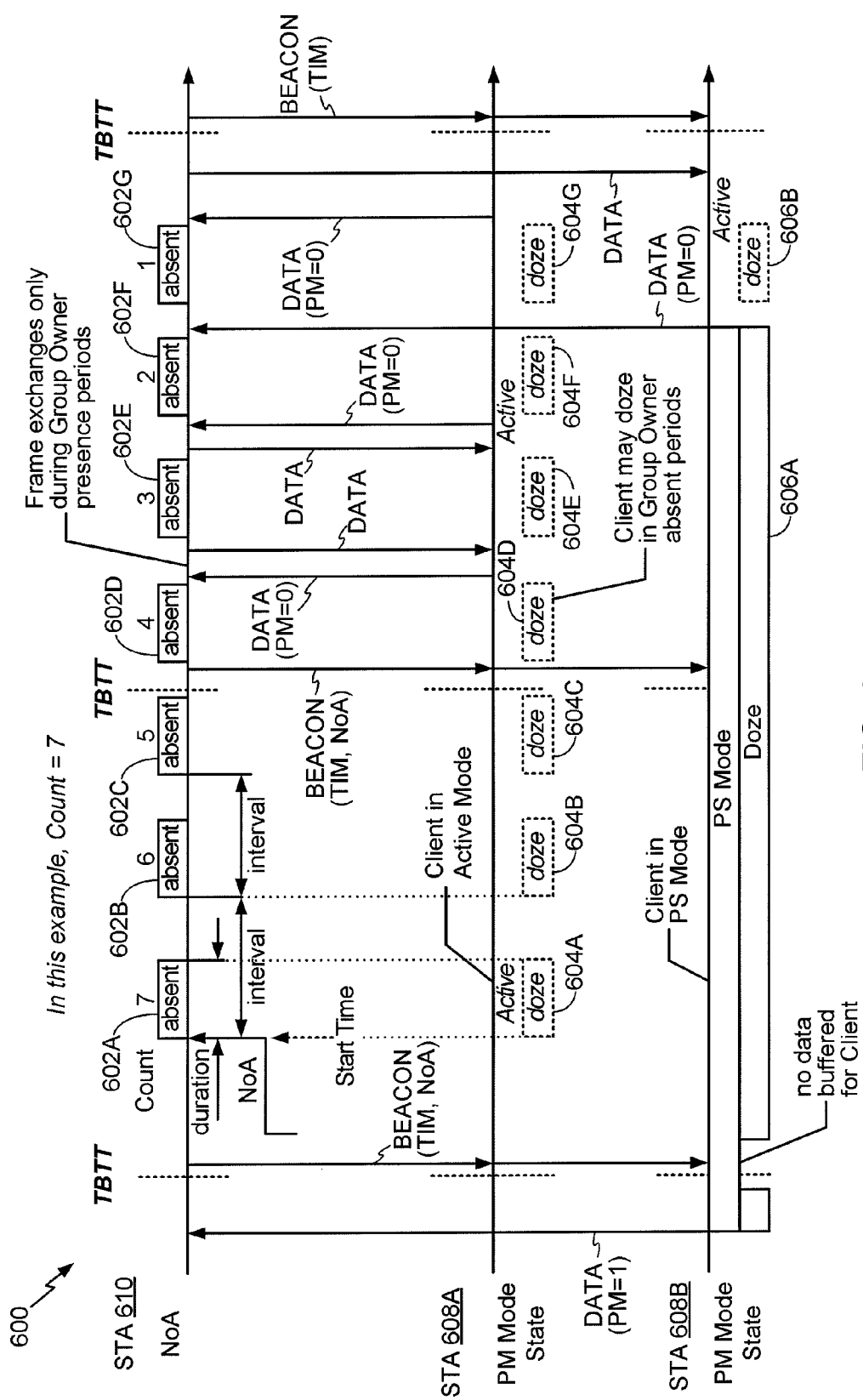
FIG. 6 is a timing flow diagram illustrating an example of notice of absence (NoA) power save.

FIG. 6 shows a timing flow diagram 600 illustrating an example of NoA power save operation for a WFD communication group. The NoA power save operation is used for scheduling periodic absence or planned periods of absence at a P2P GO within transmitted beacon frames and probe response frames. Exact periods of absence are pre-announced by the P2P GO (i.e., a STA 610 of FIG. 6) through beacon frames, probe response or NoA Frames. The P2P GO 610 may go into a doze state at the start of a start time. The P2P GO 610 may remain in a doze state for a time of a duration of a doze state. The P2P GO 610 may wake up at the end of the duration. The P2P GO 610 may go back to a doze state after an interval has expired. This procedure is repeated for a Count number of intervals. In FIG. 6, an example of Count number is 7. A Count of 255 can indicate indefinitely repeat.

In the timing flow diagram 600, power management states of a GO (a STA 610), a first client (a STA 608A), and a second client (a STA 608B) are shown. More specifically, the timing flow diagram 600 shows that the STA 610 is able to align its doze states 602A-602G with the doze states 604A-604G of the STA 608A and the doze states 606A and 606B of the STA 608B. The alignment of the doze states 602A-602G, 604A-604G, 606A and 606B is achieved by prior communications or programming between the P2P GO 610, the clients, the STAs 608A and 608B.

There may be no more than one NoA attribute in a beacon frame, probe response, or notice of absence action frame. However, there may be up to two different NoA schedules operating concurrently over a period of time. A client or a STA (e.g., the STA 608A or 608B) may request a P2P GO (e.g., the P2P GO 610) to never go into opportunistic power save by using a P2P presence request message. Opportunistic power save may be combined with a NoA power save used by a P2P GO.

There are certain priorities for determining a P2P GO power save state. An exemplary order of precedence for determining a P2P GO power save state may be: (1) a first priority: absence due to a non-periodic NoA, and a Count of 1; (2) a second priority: presence from TBTT until the end of a beacon frame transmission; (3) a third priority: presence during an awake window; and (4) a fourth priority: absence for a periodic NoA, and a count greater than 1.

In an IEEE 802.11e standard, a DLS between non-AP STAs is supported and a STA may directly transmit the frame to other STAs through a DLS direct link. A STA may operate in two different power management modes, an Active Mode (AM) and a Power Save Mode (PSM). A STA in an AM is in an awake state. A STA in a PSM may transition between an awake state and a doze state. A STA may be awake at the beginning of a wakeup state and stay awake during a wake window. A STA in a wakeup state can transmit and/or receive frames. A STA in a doze state cannot transmit and/or receive frames.

In some implementation, an AP monitors a level of load in a network and adjusts a wake-up-window. The wake-up-window is the duration that AP will be awake after the beacon transmission. For example, in one implementation of a Wi-Fi direct network, a P2P GO transmits a wake-up duration using a CTWindow. In another implementation of a multi-hop relay, each relay will adjust the wake-up-window based on a traffic of child nodes associated with the relay. One advantage of this is that less coordination may be needed between STAs and AP/relays. However, since a relay or AP may operate in a reactive mode, the initial packets may experience a larger delay.

Figure 7:
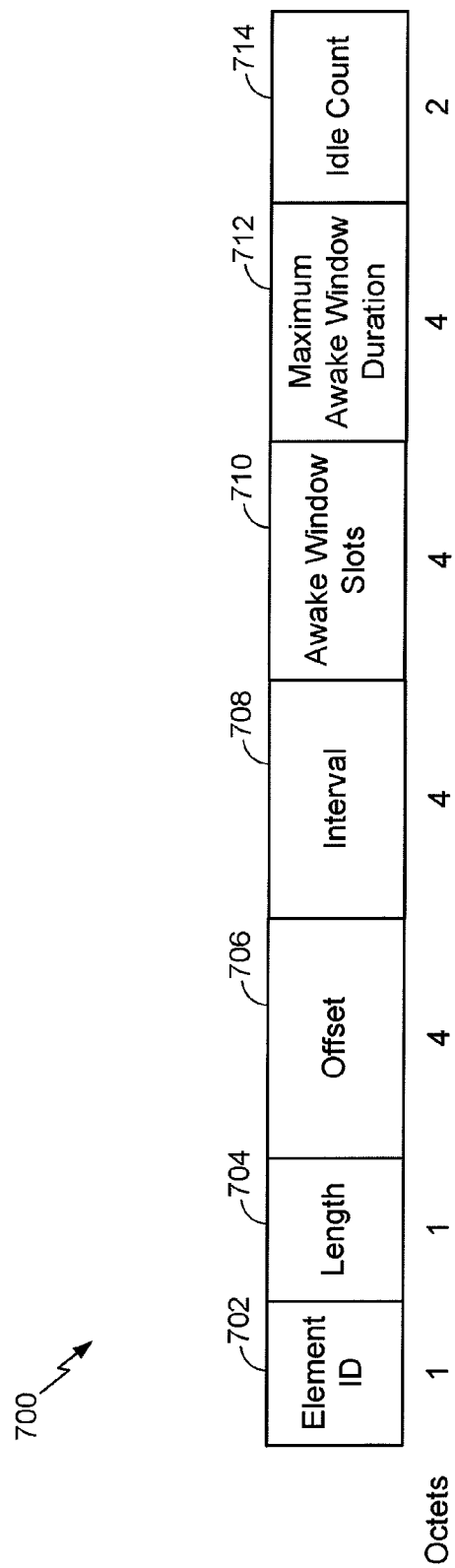
FIG. 7 is a diagram illustrating an exemplary structure of a wakeup schedule element format.

FIG. 7 shows a diagram illustrating an exemplary structure of a wakeup schedule element format. It is known that a management of power may be needed for a direct link. According to IEEE 802.11e standards, after a DLS direct link is setup, a STA in an AM or a PSM transmits a data frame and/or a management frame to other STAs through the DLS direct link. In one implementation, a TDLS peer STA requests power save using a PSM request action frame that consists of a Wakeup schedule element. Fields of a wakeup schedule element include an Offset field 706, an Interval field 708, an Awake Window Slots field 710, a Maximum Awake Window Duration field 712 and an Idle Count field 714. A value of the Interval field is an interval between two awake slots. An Awake window is in unit of slots or time units. An Awake window begins at a TSF value that satisfies an equation: the TSF value MOD an value of the Interval field 708=an value of the Offset field 706. An Awake Window ends when an Awake Window Slot counter is counted down to reach zero or a value of the Maximum Awake Window Duration field 712, whichever comes first. A zero indication in either the Awake Window Slots field 710 or the Maximum Awake Window Duration field 712 means that the other is valid. A Peer PSM element is cancelled after the Idle Count field 714 number of awake windows without a MAC protocol data unit exchange.

Figure 8:
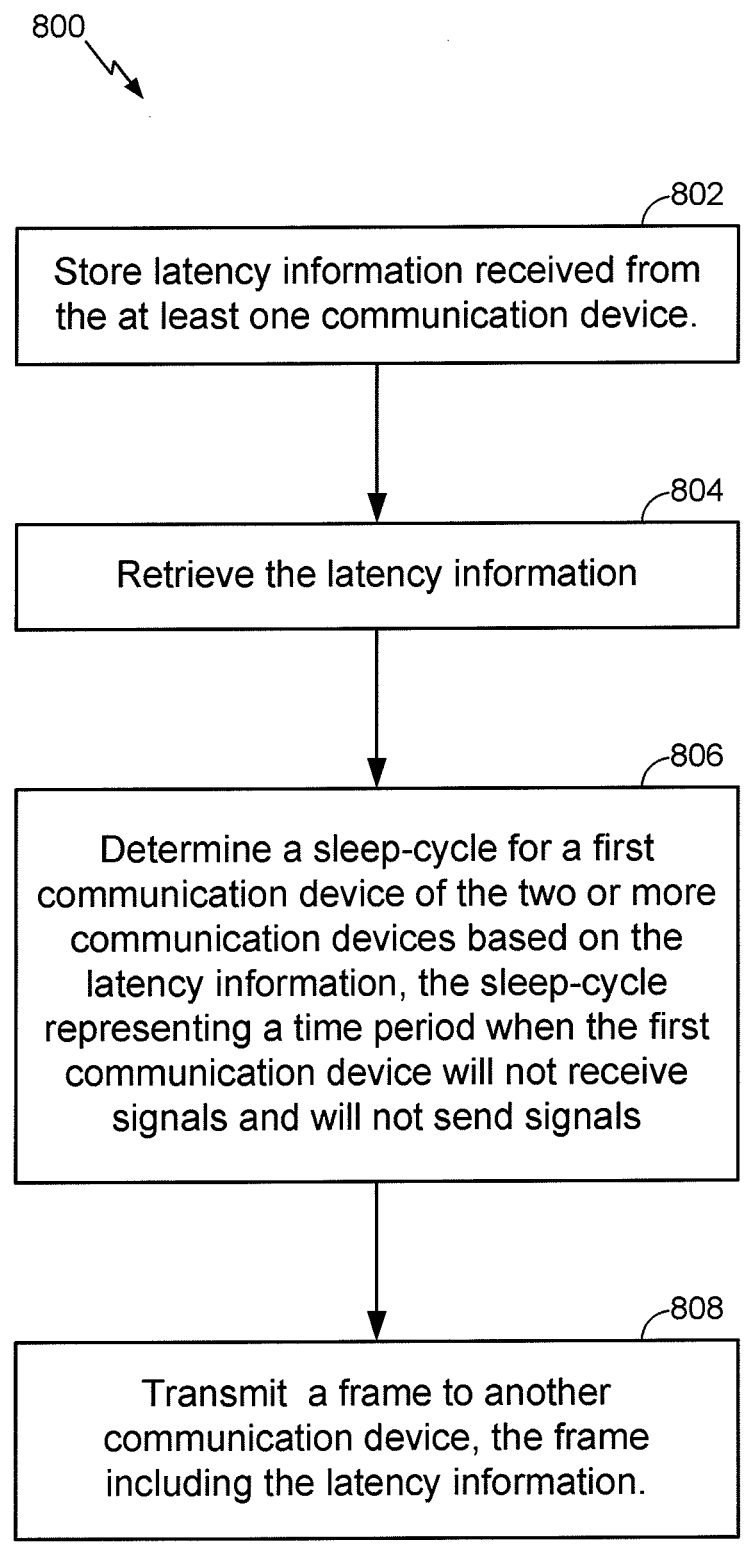
FIG. 8 is a message flow diagram illustrating an exemplary procedure of an AP power save operation.

FIG. 8 shows a message flow diagram illustrating an exemplary procedure of AP power save operation. In one implementation, a relay, an AP or a STA may advertise periods of absence at regular intervals using a signaling. The signaling may be a NoA signaling attribute. Alternatively, the signaling may be a new information element in a beacon frame. The method starts from the block 802 in FIG. 8, wherein the AP 102 stores latency information received from the at least one communication device. This latency information may be periods of absence at regular intervals of the at least one communication device. If an advertised NoA period overlaps with a TBTT, the AP 102 wakes up to transmit the beacon frame. A traffic information map (TIM) element during such a wake up period does not indicate any STAs with downlink data since STAs may be in doze states. The latency information may be stored in a memory.

Following the block 802, the AP 102 retrieves the latency information, for example, from a memory, as shown in the block 804. In the block 806, the AP 102 determines a sleep-cycle for the AP 102. The sleep-cycle represents a time period when the AP 102 will not receive signals and will not send signals. Finally in the block 808, the AP 102 transmits a frame to another communication device or STA (e.g., any of STAs 104A-104E). The frame includes the latency information received by the AP 102.

In one implementation, a STA reports its latency in an association request frame that the STA sends to a P2P GO, for example, the AP 102. The AP 102 may monitor all latency reported by all the STAs. The AP 102 may setup a sleep-cycle based on the reported latencies. In another implementation, a sleep-cycle is set to a minimum latency requirement. A sleep-cycle may span multiple TBTTs. A sleep-cycle may be advertised using NoA if an AP or relay is a WiFi Direct GO. Even if an AP or relay is not a WiFi Direct GO, then a similar information is advertised using a beacon or a probe response.

In one implementation of a multi-hop relay, a relay that determines the sleep-cycle based on child nodes reports a suggested sleep-cycle to its parents. Similarly, a parent node may go through a similar procedure and report another sleep-cycle. The procedure may be continued until sleep-cycle information is propagated to a root AP or relay.

In another implementation, APs or relays may be preconfigured with a sleep cycle duration for different time of the day. For example, a longer sleep cycle may be used for an AP or relay for between typical low-use times of the day, for example, between 2:00 AM and 5:00 AM. In another example, during a typical high-use time of day, for example, between 3 PM and 6 PM, the sleep cycle may be preconfigured to be of a shorter duration, or the shortest possible duration such that factors other than the time of day may determine the duration of a sleep cycle.

Figure 9:
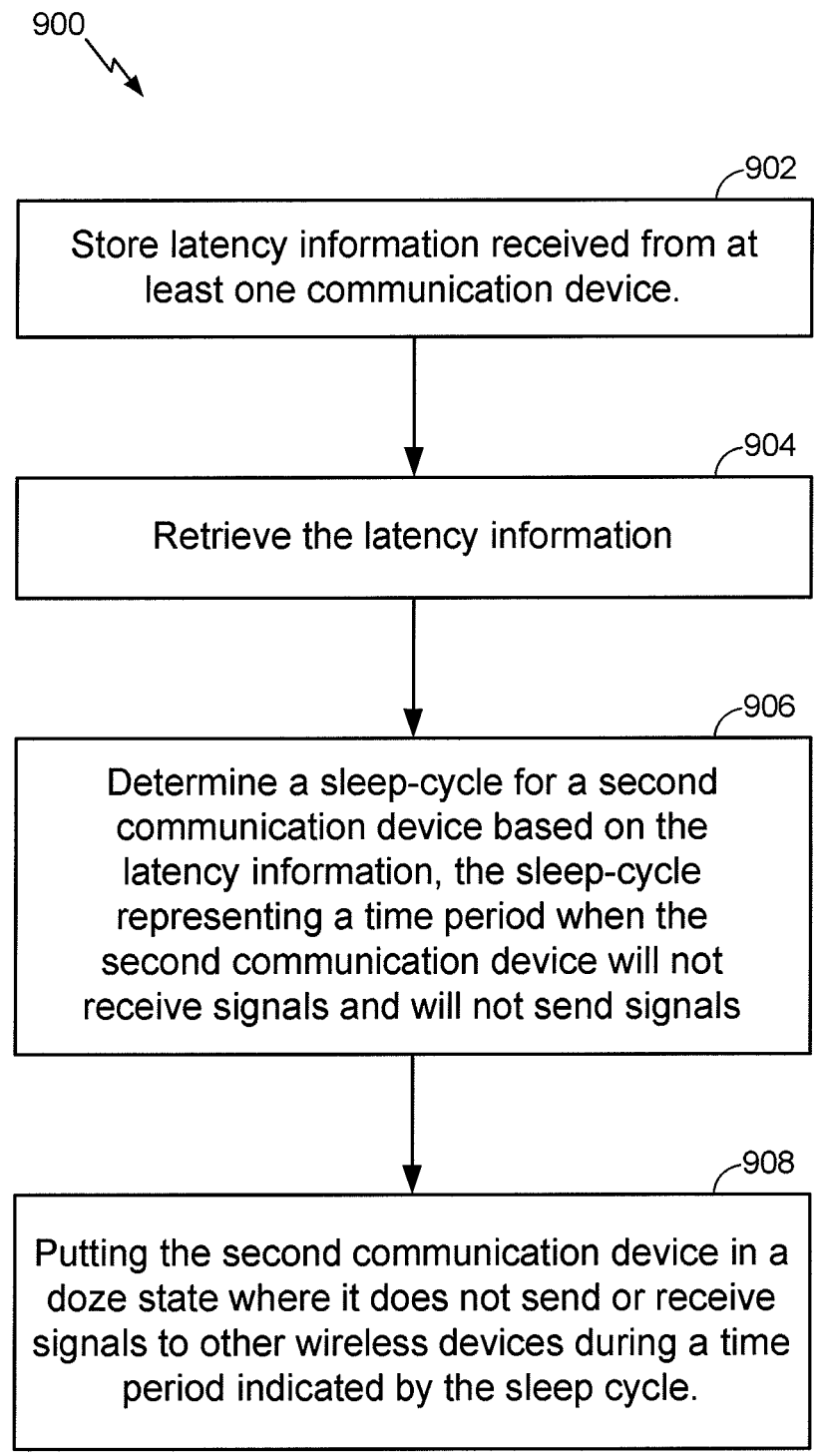
FIG. 9 is a message flow diagram illustrating an exemplary procedure of an AP opportunistic power save.

FIG. 9 illustrates another flowchart of an exemplary method of adjusting a wake-up window by the relay 104A in a multi-hop relay network. In one implementation, an AP moves to a doze state opportunistically if all its client STAs are in doze states. In the opportunistic power save, the AP wakes up every TBTT and remains in an awake state for at least a predefined AwakeWindow time as defined in a wakeup schedule element. A value of AwakeWindow may be defined in slots. The slots may represent the amount of idle time of the medium before the device will go to sleep. An AP counts down AwakeWindow slots when an associated channel or medium is free. An AP or relay may go to sleep quickly if there are no pending uplink transmissions. The AwakeWindow counts down may be restarted whenever the AP or relay receives an uplink packet, interrupting the countdown of the slots. The method starts from the block 902 in FIG. 9, wherein the AP 102 stores latency information received from the at least one communication device. Following the block 902, the AP 102 retrieves the latency information. In one implementation, the AP 102 stores the latency information into a memory. In the block 906, the AP 102 determines a sleep-cycle for the AP 102. The sleep-cycle represents a time period when the AP 102 will not receive signals and will not send signals. In one implementation, this latency information includes periods of absence at regular intervals of the at least one communication device. In another implementation, when the AP 102 wakes up during a TBTT overlapping an NoA, the AP 102 goes to a doze state after sending the beacon frame without determining if all STAs are asleep, that is, immediately goes into a doze state after sending the beacon. At the same time, associated STAs may not send uplink data after a beacon frame during such a NoA period. In the block 908, the AP 102 is configured to not send or receive signals to other wireless devices during a time period indicated by the sleep cycle.

Figure 10:
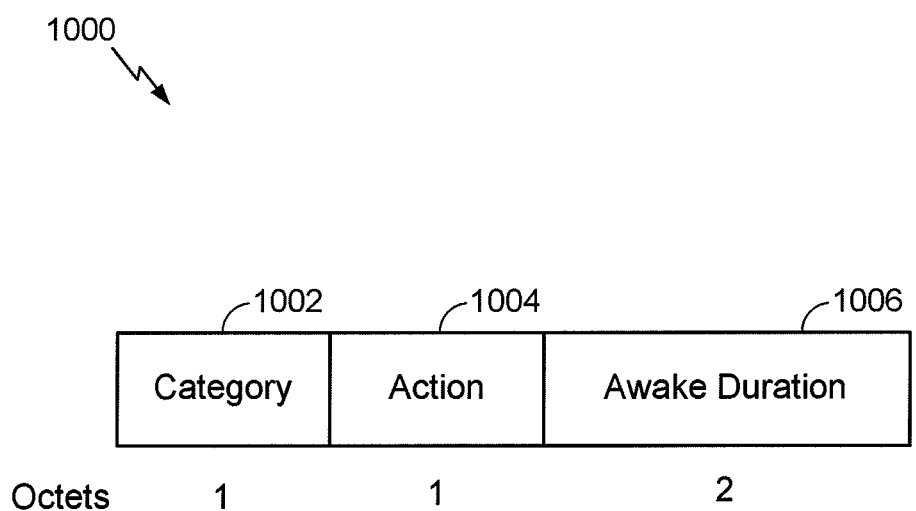
FIG. 10 is a diagram illustrating an exemplary structure of an Extended Awake frame format.

FIG. 10 shows a diagram illustrating an exemplary structure of an Extend Wake frame format. Fields of an Extend Wake frame include a Category field 1002, an Action field 1004, and an Awake Duration field 1006.

Figure 11:
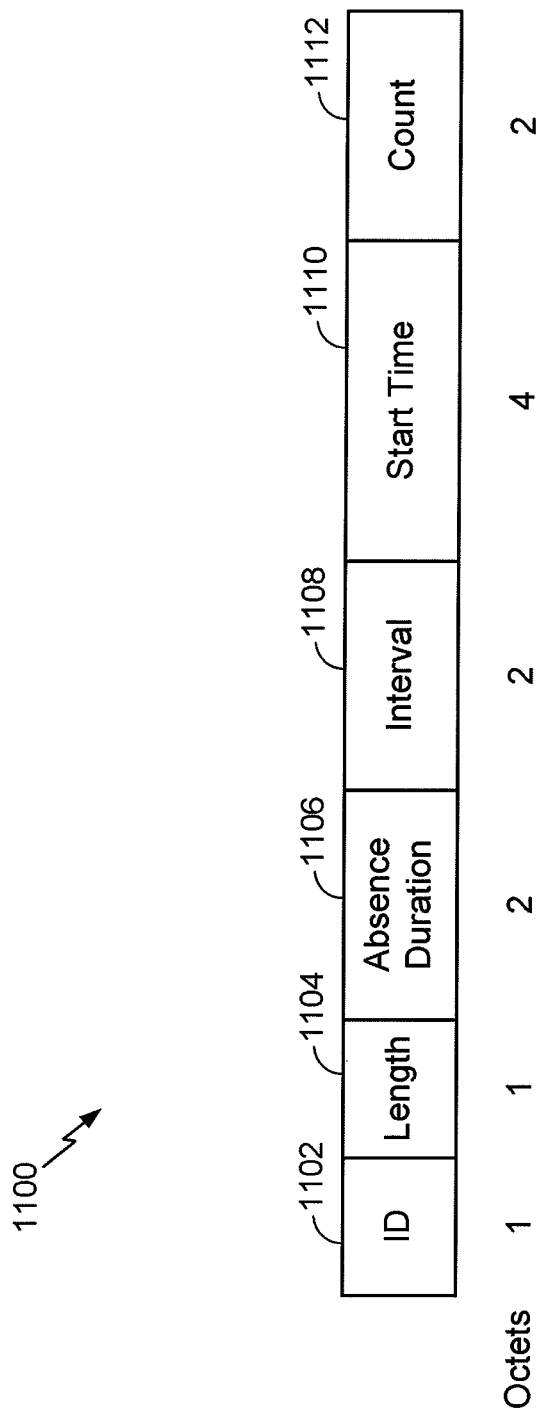
FIG. 11 is a diagram illustrating an exemplary structure of a NoA element format.

To enable standardization in IEEE, NoA information that is in a P2P IE will have to be carried in a separate IE. FIG. 11 shows a diagram illustrating an exemplary structure of a new NoA element format. Fields of a new NoA element include an Absence Duration field 1106, an Interval field 1108, a Start Time field 1110, a Count field 1112. A value of the Absence Duration field 1106 is a length of a NoA period in millisecond. The Interval field 1108 indicates an interval between start times of NoA periods. A value of the Start Time field 1110 is a least significant bit or set of bits of a timer synchronization function (TSF) timer at a start of a NoA cycle. The value of the Count field 1112 is the number of NoA periods before a current setting expires.

Figure 12:
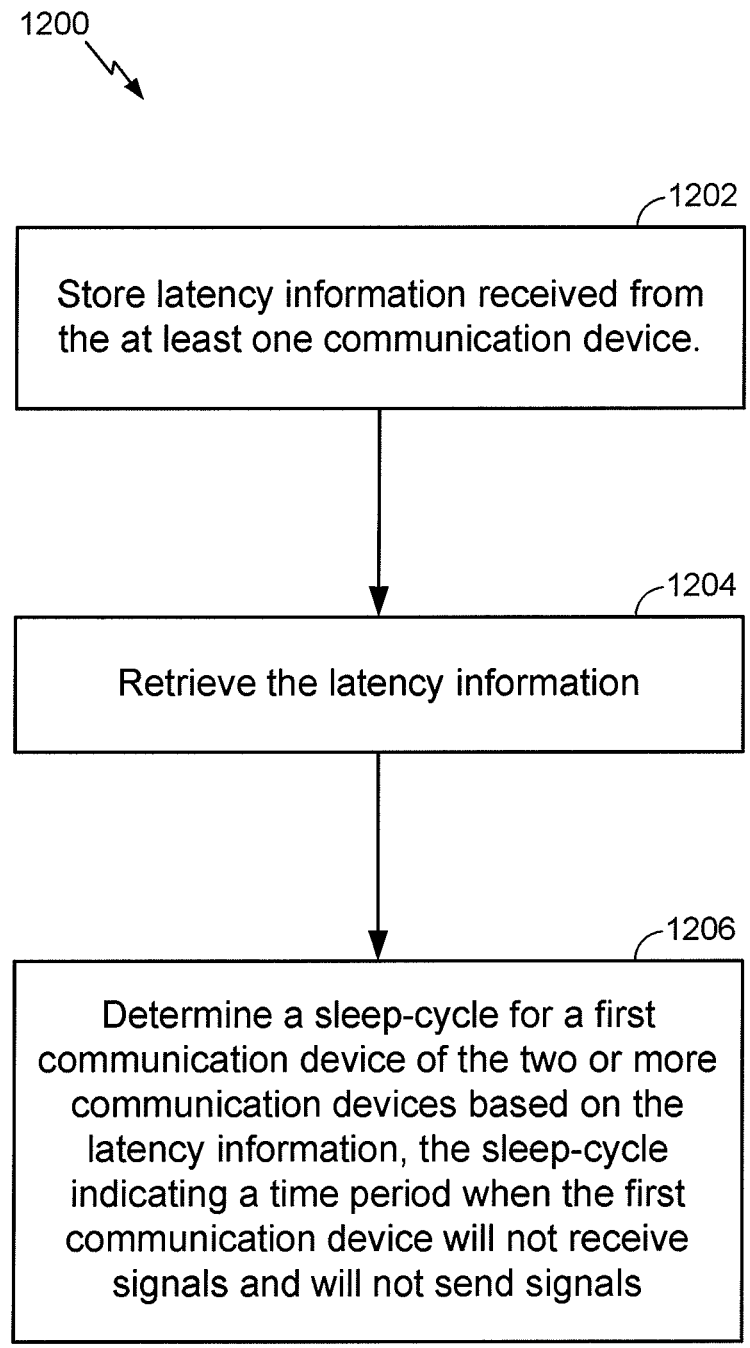
FIG. 12 is a message flow diagram illustrating an exemplary procedure of an AP power save.

FIG. 12 shows a message flow diagram illustrating an exemplary procedure of AP power save operation. In one implementation, a relay, an AP or a STA may advertise periods of absence at regular intervals using a signaling. The signaling may be a NoA signaling attribute. Alternatively, the signaling may be a new information element in a beacon frame. The method starts from the block 1202 in FIG. 12, wherein the AP 102 stores latency information received from the at least one communication device. The means for storing the latency information may include a memory (e.g., the memory 212 of FIG. 2). Following the block 1202, the AP 102 retrieves the latency information and the AP 102 determines a sleep-cycle for the AP 102. The sleep-cycle represents a time period when the AP 102 will not receive signals and will not send signals. The means for retrieving and determining may include a processor (e.g., the processor of FIG. 2).

Figure 13:
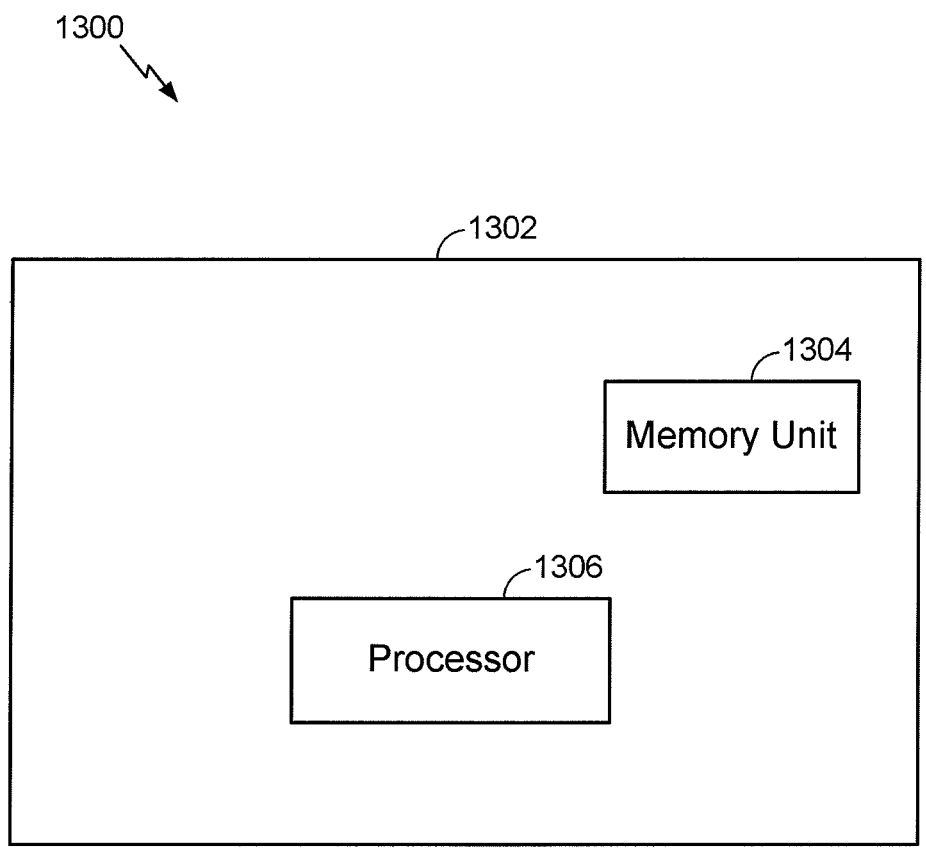
FIG. 13 is a diagram illustrating an example of a wireless STA.

FIG. 13 shows details of one exemplary implementation of the STA 104A illustrated in FIG. 1 and the STA 204A illustrated in FIG. 2. Although in the described implementations the elements of a STA 1302 are presented in one arrangement, other implementations may feature other arrangements. In one implementation, elements of the STA 1302 can be implemented in hardware, software, or any combination thereof. As shown in FIG. 13, the STA 1302 includes a processor 1306 (e.g., the PHY layer processing unit 306 of FIG. 3) and a memory unit 1304 (e.g., the memory 212 of FIG. 2 or the memory 312 of FIG. 3). The processor 1306 is coupled to the memory unit 1304. It may be further coupled to a RF transceiver (e.g., the RF transceiver 314 of FIG. 3) for receiving and transmitting wireless signals.

In another implementation, the AP 102 may extend its awake time beyond a value of Awake Window by sending an Extend Awake broadcast frame. After this, the AP 102 continues to remain awake for the time indicated by the Extend Awake broadcast frame. The AP 102 sends this Extend Awake broadcast frame only at where there is no other medium activity and only at time after a duration of the Awake Window. A STA that wakes up after the Awake Window duration determines if the AP 102 is awake by sniffing packets on the air to check for packets transmitted to/from the AP 102, or by receiving a Extend Awake frame of the AP 102.

In one implementation, at every TBTT, an AP changes to an awake state and sends a beacon frame. The beacon frame may contain a TIM. In another implementation, for every STA indicated in a TIM, the state of an AP is awake until its data is delivered. The AP may not go into a doze state until downlink data for all STAs is delivered. A STA that is polled by the TIM can always send its power save poll without explicitly determining that the AP is awake. In another implementation, when all downlink data is delivered, an AP starts a counter or a timer. If any uplink data are received, the AP stops the counter and remains in an awake state until each STA that it receives data from indicates that there is no more data, e.g., using a More Data bit. Once the AP determines that there is no more uplink data, it starts the count down again.

In one implementation, an STA can send uplink data or QoS null information within an initial awake time of an associated AP with an indication of more data. The AP will then remain awake until it receives an indication from the STA that there is no more uplink data to send. In another implementation, an STA that wakes up in the middle of a TBTT may assume that an associated AP is in a doze state if its wake up time is beyond an awake time of the associated AP, e.g., with regard to a beacon frame.

In another implementation, a STA sees downlink data indication for itself in a TIM, the STA can send a PS poll without explicitly tracking an AP state. An associated AP is expected to remain awake until it has completed data transmission to the STA. In another implementation, an STA has uplink data to send. It may send data, or QoS null within an Awake window following a TBTT. It may set a More Data indication to force an associated AP to remain awake until all data from the STA has been sent. In another implementation, when data transmission is complete, the STA may reset a More Data indication to enable an associated AP to start a doze state.

In one implementation, to help STAs that may have woken up in the middle of a beacon frame interval beyond the wake up interval, an AP should transmit a frame indicating that it is beginning a countdown to a doze mode. The frame contains information of time remaining for the AP. The AP may inform a STA that the AP is awake and can receive data for a certain time before moving into a doze state.

In another implementation, an AP wakes up at TBTT to transmit a beacon frame to enhance discoverability of the AP. In some implementations, the AP may be in a doze state only if every client STA is determined to be in doze states. In some implementations, an AP may use a Awake Count or Max Awake time to indicate an amount of idle time before going back to a doze state, as defined in a TDLS Peer PSM. A doze time countdown starts after an AP completes a transmission/reception. The countdown is reset if any activity for the AP occurs during the count down. In another implementation, an AP uses an opportunistic power save scheme if every client supports an opportunistic power save scheme.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the applications have been described herein. It is to be understood that not necessarily all such advantages may be achieved in accordance with any particular implementation of the application. Thus, the application may be embodied or carried out in a manner that achieves or optimizes one advantage or group of advantages as taught herein without necessarily achieving other advantages as may be taught or suggested herein.

Various modifications of the above described implementations may be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for communicating with at least one communication device of a wireless network via a channel, comprising:
    a transceiver configured to receive latency information from the at least one communication device; and
    a processor operationally coupled to the transceiver, the processor configured to:
        determine an awake duration based on a first set of latency information, wherein the transceiver is further configured to communicate with the at least one communication device for the awake duration,
        determine a sleep-cycle based on the first set of latency information, the sleep-cycle to begin after expiration of the awake duration, wherein the transceiver is further configured to stop communication with the at least one communication device for the sleep-cycle, and
        update the awake duration based on a second set of latency information, the transceiver further configured to communicate with the at least one communication device for the updated awake duration.

2. The apparatus of claim 1, further comprising a receiver coupled to the processor, the receiver and the processor collectively configured to receive a frame that includes the latency information from the at least one communication device, wherein the processor is configured to store the latency information in a memory unit, and wherein the sleep-cycle indicates a time-period during which the receiver will not receive wireless signals from wireless devices.

3. The apparatus of claim 2, further comprising a transmitter, wherein the sleep-cycle indicates the time-period during which the transmitter will not send signals to wireless devices.

4. The apparatus of claim 3, wherein the processor and the transmitter collectively are configured to send at least one frame to the at least one communication device, the at least one frame including information indicating the time-period during which the apparatus will not send or receive signals to other wireless devices.

5. The apparatus of claim 1, wherein the apparatus is powered by a battery.

6. The apparatus of claim 1, wherein the apparatus is an Access Point (AP).

7. The apparatus of claim 1, wherein the apparatus is a relay device.

8. The apparatus of claim 1, wherein the processor is configured to cause the sleep-cycle to recur at a regular interval.

9. The apparatus of claim 4, wherein the at least one frame sent indicates the sleep-cycle using a Notice of Absence.

10. The apparatus of claim 3, wherein the transmitter is further configured to transmit a beacon frame when the sleep-cycle overlaps with a beacon transmission time.

11. The apparatus of claim 10, wherein the apparatus is further configured to enter a doze state after sending the beacon frame.

12. The apparatus of claim 10, wherein the apparatus is further configured to enter a doze state after a time greater than that provided by an AwakeWindow time.

13. The apparatus of claim 10, wherein the transmitter is further configured to send, in response to a probe request frame received by the apparatus from the at least one communication device and indicating a request for information, a response at least indicating that the transmitter is active.

14. The apparatus of claim 10, wherein the transmitter is further configured to send a response to at least one association request frame to the at least one communication device when the receiver receives the at least one association request frame from the at least one communication device, the association request frame including at least sleep-cycle information of the at least one communication device.

15. The apparatus of claim 3, wherein the transmitter is further configured to transmit a beacon frame when it is a beacon transmission time and the receiver is further configured to monitor the channel for the awake duration, the awake duration being for at least a designated awake time.

16. The apparatus of claim 15, wherein the awake duration restarts when the receiver receives the beacon frame from the at least one communication device.

17. The apparatus of claim 15, wherein the transmitter is further configured to send an extend awake frame, the extend awake frame indicating that the apparatus will monitor the channel for a certain amount of time after the awake duration.

18. The apparatus of claim 15, wherein the transmitter is further configured to send an extend awake frame after the apparatus receives no frames transmitted from the at least one communication device during the awake duration.

19. The apparatus of claim 15, wherein the transmitter is further configured to send an extend awake frame comprising:
a category field indicative of a category;
an action field indicative of an action; and
an awake duration field indicative of a length of time greater than an AwakeWindow time.

20. The apparatus of claim 1, wherein the transceiver is further configured to send a Notice of Absence frame that includes information of an extend awake frame that indicates the apparatus will be in an awake state for a certain amount of time after the awake duration.

21. The apparatus of claim 1, wherein the processor is further configured to use two or more sleep-cycles each having different durations and each used during different times of a day.

22. The apparatus of claim 1, wherein the processor is further configured to monitor a level of communication activity of the wireless network and adjust the sleep-cycle based on the level of communication activity.

23. The apparatus of claim 1, wherein the latency information is based on an amount of communication activity of the at least one communication device.

24. A method of communicating between two or more communication devices via a channel, the method comprising:
receiving latency information from a first communication device of the two or more communication devices;
determining an awake duration based on a first set of latency information;
communicating with the first communication device for the awake duration;
determining a sleep-cycle based on the first set of latency information, the sleep-cycle to begin after expiration of the awake duration ending communication with the two or more communication devices during the sleep-cycle;
updating the awake duration based on a second set of latency information; and
communicating with the at least one communication device for the updated awake duration.

25. The method of claim 24, further comprising receiving a frame that includes latency information from the first communication device, wherein the sleep-cycle indicates a time-period during which a second communication device of the two or more communication devices will not receive signals.

26. The method of claim 24, wherein the sleep-cycle further indicates a time-period during which a second communication device of the two or more communication devices will not send signals to other wireless devices.

27. The method of claim 24, further comprising sending at least one frame to the first communication device, the at least one frame including information indicating a time-period during which a second communication device of the two or more communication devices will not send or receive signals to other wireless devices.

28. The method of claim 24, wherein at least one of the two or more communication devices is powered by a battery.

29. The method of claim 24, wherein at least one of the two or more communication devices is an Access Point (AP).

30. The method of claim 24, wherein at least one of the two or more communication devices is a relay.

31. The method of claim 24, wherein the sleep-cycle recurs at regular intervals.

32. The method of claim 27, wherein the at least one frame sent indicates the sleep-cycle using data representing a Notice of Absence.

33. The method of claim 26, further comprising transmitting a beacon frame when the sleep-cycle overlaps with a beacon transmission time.

34. The method of claim 33, further comprising setting at least one of the two or more communication devices into a doze state after sending the beacon frame.

35. The method of claim 33, further comprising setting at least one of the two or more communication devices into a doze state after sending the beacon frame and after a length of time greater than an AwakeWindow duration.

36. The method of claim 33, further comprising sending, in response to a probe request frame received by a second communication device of the two or more communication devices from the first communication device and indicating a request for information, a response at least indicating that the second communication device is active.

37. The method of claim 33, wherein when a second communication device of the two or more communication devices receives at least one association request frame from the first communication device, the second communication device sends a response to the association request frame to the first communication device, the association request including at least sleep-cycle information of the second communication device.

38. The method of claim 24, further comprising transmitting a beacon frame, via at least one of the two or more communication devices when it is a beacon transmission time, and monitoring the channel for the awake duration, the awake duration being for at least a designated awake time.

39. The method of claim 35, wherein an awake extended duration is a time-period indicated in a number of slots that represent an amount of idle time before a second communication device of the two or more communication devices will go to doze state, the method further comprising counting down the number of slots and putting the second communication device in the doze state if the countdown of the number of slots reaches zero before the second communication device receives an uplink communication.

40. The method of claim 39, further comprising restarting the countdown of the number of slots if the second communication device receives an uplink packet before the countdown reaches zero.

41. The method of claim 35, wherein an awake time indicated by an extend awake frame restarts when the second communication device receives a frame from the first communication device.

42. The method of claim 35, wherein the second communication device sends an extend awake frame, the extend awake frame indicating that the second communication device monitors the channel for a certain amount of time after the awake window duration.

43. The method of claim 42, wherein the second communication device sends the extend awake frame after the second communication device receives no frames transmitted from the first communication device during the awake duration.

44. The method of claim 34, wherein setting at least one of the two or more communication devices into the doze state comprises setting the device into the doze state immediately after sending the beacon frame.

45. The method of claim 42, wherein the extend awake frame includes
a category field configured to indicate a category;
an action field configured to indicate an action; and
an awake duration field configured to indicate a length of an extended duration.

46. The method of claim 24, wherein at least one of the two or more communication devices sends a Notice of Absence frame that includes information of an extend awake frame that indicates the apparatus will be in an awake state for an amount of time after the awake duration.

47. An apparatus for communicating with at least one communication device via a channel, comprising:
    means for communicating, the means for communicating configured to receive latency information from the at least one communication device;
    means for determining:
        an awake duration based on a first set of latency information, wherein the means for communicating is configured to communicate with the at least one communication device for the awake duration,
        a sleep-cycle based on the first set of latency information, the sleep-cycle to begin after expiration of the awake duration, wherein the means for receiving latency information is further configured to stop communication with the at least one communication device for the sleep-cycle, and
        an update to the awake duration based on a second set of latency information, the means for receiving latency information further configured to communicate with the at least one communication device for the updated awake duration.

48. The apparatus of claim 47, wherein the communicating means receives the latency information in a wireless communication signal from the at least one communication device, and is configured to store the latency information in a means for storing, and wherein the sleep-cycle indicates a time-period during which the communicating means will not receive the wireless communication signals.

49. The apparatus of claim 48, wherein the communicating means is further configured to not send wireless communication signals during the time-period indicated by the sleep-cycle.

50. The apparatus of claim 49, wherein the communicating means is further configured to send at least one frame to the at least one communication device, the at least one frame including information indicating the time-period during which the communicating means will not send or receive wireless communication signals to other wireless devices.

51. A non-transitory computer readable media having instructions stored thereon that cause a wireless communication apparatus to perform a method of:
    receiving latency information received from at least one communication device;
    determining an awake duration based on a first set of latency information;
    communicating with the at least one communication device for the awake duration;
    determining a sleep-cycle based on the first set of latency information, the sleep-cycle to begin after expiration of the awake duration;
    ending communication with the at least one communication device during the sleep-cycle;
    updating the awake duration based on a second set of latency information; and
    communicating with the at least one communication device for the updated awake duration.

52. The non-transitory computer readable media of claim 51, wherein the method further comprises receiving a frame that includes latency information from a first communication device, wherein the sleep-cycle indicates a time-period during which a second communication device will not receive wireless communication signals.

53. The non-transitory computer readable media of claim 51, wherein the method further comprises determining the sleep-cycle indicating a time-period during which the at least one communication device will not send wireless communication signals to other wireless devices.

* * * * *